US006582624B2

United States Patent
Titley et al.

(10) Patent No.: US 6,582,624 B2
(45) Date of Patent: Jun. 24, 2003

(54) METHOD AND COMPOSITION FOR REMOVING SULFIDES FROM HYDROCARBON STREAMS

(75) Inventors: Clive Willaim Titley, Calgary (CA); Peter Hans Wieninger, Calgary (CA)

(73) Assignee: Canwell Enviro-Industries, Ltd., Alberta (CA)

( * ) Notice: Subject to any disclaimer, the term of this patent is extended or adjusted under 35 U.S.C. 154(b) by 157 days.

(21) Appl. No.: 09/776,595

(22) Filed: Feb. 1, 2001

(65) Prior Publication Data

US 2002/0139717 A1 Oct. 3, 2002

(51) Int. Cl.[7] .............................. C09K 3/00; C09K 3/32
(52) U.S. Cl. .................. 252/182.12; 544/180; 544/216
(58) Field of Search ................... 252/182.12; 544/180, 544/216

(56) References Cited

U.S. PATENT DOCUMENTS

| | | | |
|---|---|---|---|
| 2,776,870 A | * 1/1957 | Fischer | |
| 4,748,011 A | 5/1988 | Baize | |
| 4,978,512 A | * 12/1990 | Dillon | 423/266 |
| 5,128,049 A | * 7/1992 | Gatlin | 423/266 |
| 5,347,004 A | 9/1994 | Rivers et al. | |
| 5,508,012 A | * 4/1996 | Trauffer | 423/225 |
| 5,554,349 A | 9/1996 | Rivers et al. | |
| 5,674,377 A | * 10/1997 | Sullivan, III et al. | 423/228 |
| 5,744,024 A | * 4/1998 | Sullivan, III et al. | 423/242.6 |
| 5,980,845 A | * 11/1999 | Cherry | 423/226 |
| 6,063,346 A | * 5/2000 | Luna | 423/226 |

FOREIGN PATENT DOCUMENTS

| CA | 2005946 | 2/1995 |
|---|---|---|
| CA | 2269476 | 5/1998 |

\* cited by examiner

*Primary Examiner*—Margaret Medley
(74) *Attorney, Agent, or Firm*—Pennie & Edmonds LLP

(57) ABSTRACT

A method and composition for reducing the levels of hydrogen sulphide and mercaptans in hydrocarbon streams. The method comprises contacting the gas stream with a composition comprising the reaction product of mixing monoethanolamine, diglycolamine and formaldehyde. The use of the method and composition alleviates problems associated with crystalline dithiazine deposit build-up associated with the use of triazine based scavengers.

10 Claims, 6 Drawing Sheets

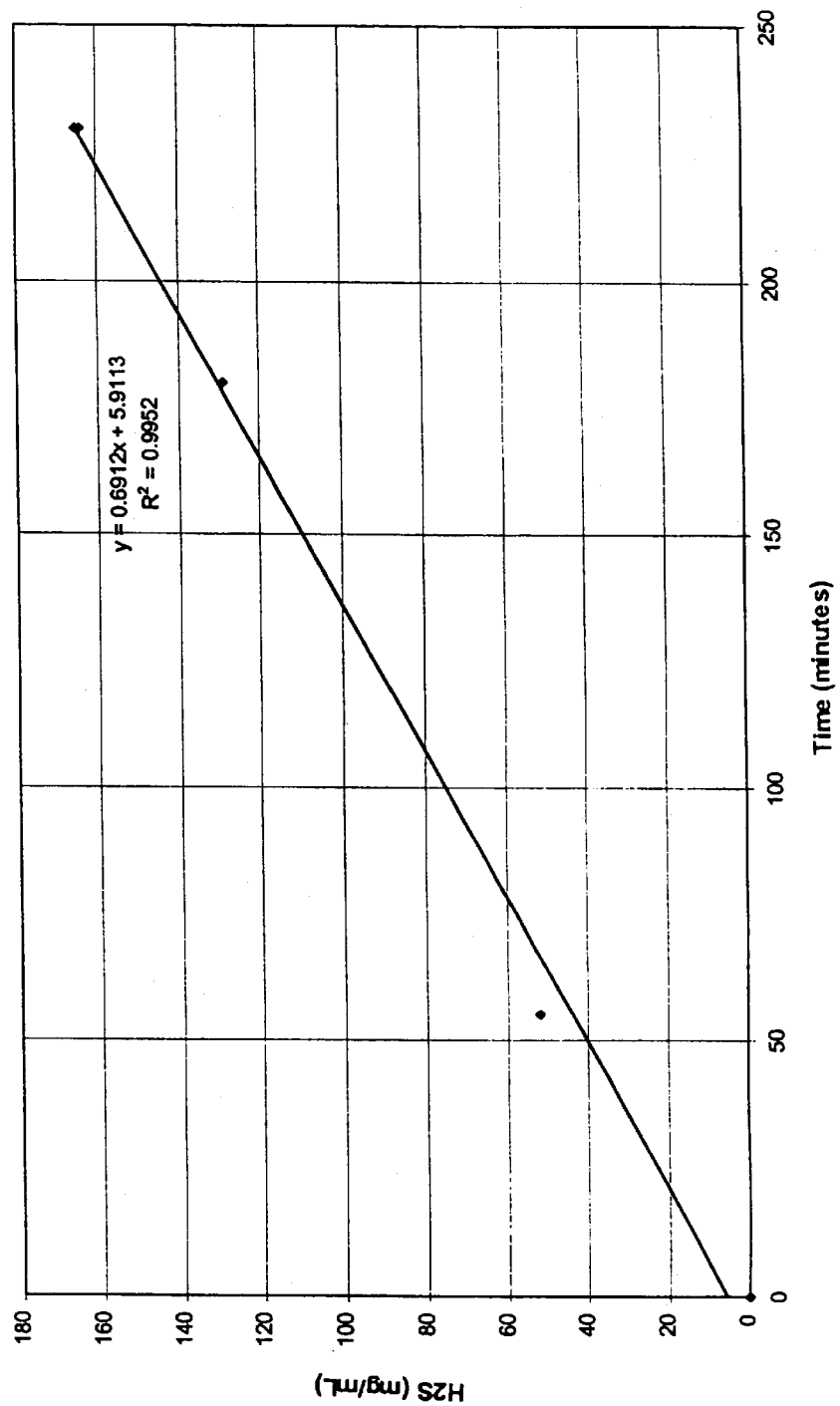
FIG. 1(b) Capacity Test-20% H2S : 0% DGA H2S Content of Scavenger

METHOD AND COMPOSITION FOR REMOVING SULFIDES FROM HYDROCARBON STREAMS

FIELD OF THE INVENTION

This invention relates to chemical compositions for reducing the levels of hydrogen sulphide and mercaptans in hydrocarbon streams.

BACKGROUND OF THE INVENTION

A large number of compositions are known for removing or reducing the hydrogen sulphide content of and removing mercaptans from natural gas, crude oil, and other hydrocarbon streams. These compositions include those based on alkanolamine and aldehyde reaction products such as described in U.S. Pat. No. 4,978,512 which issued on Dec. 18, 1990 to Quaker Chemical Corporation. These reaction products include triazine compounds, and in particular 1,3,5 tri-(2-hydroxy-ethyl)-hexahydro-S-triazine.

While alkanolamine and aldehyde reaction products such described in U.S. Pat. No. 4,978,512 are effective hydrogen sulphide scavengers, they are known to form solids upon reaction with hydrogen sulphide. In particular, the reaction with hydrogen sulphide forms dithiazine which is not water soluble. Dithiazine forms a separate liquid phase or layer in gas processing equipment. In temperatures of about 20° C. or lower, solid dithiazine crystals form in this layer and precipitate out of solution.

Substantial amounts of dithiazine solid deposit buildup routinely occurs in gas processing equipment, particularly in colder weather applications. These dithiazine deposits are crystalline in nature and are particularly difficult to remove. For example, in bubble tower gas contactors, dithiazine crystals build up in the bottom of the tower and plug the lines through which the spent scavenger chemical is drawn off. Similarly, dithiazine forms a solid crystalline layer in the bottom of the spent scavenger chemical storage tanks located at the well site. Even for inline injection applications, dithiazine crystals tend to accumulate in areas of line restriction such as chokes and in dips or "dead spots" in the gas line. Further, crystallization can occur in bulk truck tanks used to haul away spent product and can cause plugging problems in produced water disposal wells. An enormous amount of effort continues to be expended simply in cleaning out gas processing equipment to remove dithiazine deposits. Often, the only practical solution is to manually chip away the deposits and/or dissolve the dithiazine deposits by steam or hot water. This is an expensive and time consuming process which requires the gas processing equipment to be shut down until treatment is complete.

There have been a number of attempts to improve the performance of triazine based scavengers. For example, there is disclosed in U.S. Pat. Nos. 5,347,004 and 5,554,349 (Rivers et al.), the use of a mixture of amines to scavenger hydrogen sulphide from natural gas, The mixture includes reaction products or blends of alkoxyalkylene amines, ammonia and dialkylamines with formaldehyde wherein the reaction product is a hexahydrotriazine having at least one substituent being an alkoxyalkylene group. While Rivers et al. discloses that the amine mixture may be employed without the need for antifreeze or polymerization inhibitors, there is no suggestion that the amine mixture will have any effect on the formation of dithiazine solids.

There is disclosed in PCT international application No. PCT/CA97/00826 (Warrender et al.) a scavenger composition which comprises a reaction product of formaldehyde with arninoethylpiperazine (AEP) and a second or "enhancing" amine, which can be monoethanolamine. The reaction product is described as reacting with impurities in the natural gas to form a hydrophobic component which forms a second liquid phase so as to solubilize the hydrophobic reaction products to preclude the formation of solids. It would appear from the disclosure, that the solids referred to are not dithiazine solids. The test results in the disclosure indicate that solids formed slowly over time, presumably at room temperature, after the scavenger compositions were subjected to hydrogen sulphide breakthrough tests, i.e., by "overspending" the scavenger. These solids were apparently not observed when a sufficient amount of the enhancing amine was used. It has been found that solids that are produced at room temperature in conventional laboratory hydrogen sulphide breakthrough" tests by continuing to overspend the scavenger composition until well after breakthrough are not of the type typically experienced in the field. It is believed that over spending a triazine based scavenger in a laboratory test causes the third ring nitrogen in the triazine molecule to be displaced by sulphur causing the ring to open and the resulting molecule to undergo a slow polymerization type reaction to produce an amorphous solid.

This type of solid is not typically encountered in field applications as the scavenger chemical must be replaced or regenerated at or before breakthrough in order to avoid production of non-merchantable gas. Moreover, dithiazine solids do not usually form at room temperature. The solidification point of pure dithiazine is about 46° C. However, residual methanol (typically present as part of the Formalin component) plus other components in reacted triazine based scavengers mixes with the dithiazine layer and lowers the solidification point below 20° C. Thus, solids formation observed in laboratory breakthrough tests at room temperature are typically not dithiazine. It is very difficult to form a dithiazine crystal in laboratory tests. In field applications, methanol is more readily lost and hence initiation of crystal formation is more apparent. There also may be other impurities in field gas streams or equipment which seed initial crystallization.

Accordingly, while the prior art teaches a number of possible solutions to solids buildup associated with triazine based hydrogen sulphide scavengers, none have effectively addressed the particular problem of dithiazine solids buildup in field applications. There remains a need for a scavenger composition that is effective at removing hydrogen sulphide and which avoids the problems of dithiazine deposit formation characteristic of alkanolamine/aldehyde scavenging products.

SUMMARY OF THE INVENTION

It has been found that the problem of dithiazine crystallization encountered with certain of the preferred scavenging composition described U.S. Pat. No. 4,978,512 can be avoided by the substitution of diglycolamine for a minor amount of the monoethanolamine from which the scavenging product reaction is formed. In particular, it has been found that in field applications, the spent composition of the present invention has a lower freezing point than the corresponding spent reaction product without diglycolamine. Moreover, the dithiazine solids that are produced at low temperatures in the spent reaction product of the present invention do not exhibit a crystalline structure, but instead are characterized by an amorphous and "mushy" consistency and greatly facilitate the task of cleaning gas processing equipment.

Furthermore, the scavenger composition of the present invention has been found to exhibit slightly better hydrogen sulphide scavenging capacity than the corresponding reaction product without diglycolamine.

Thus in accordance with one aspect of the present invention, there is provided a hydrogen sulphide and mercaptan scavenging composition comprising the reaction product of mixing monoethanolamine, diglycolamine and formaldehyde.

In accordance with a further aspect of the present invention, there is provided a method for reducing the levels of hydrogen sulphide in hydrocarbon streams comprising contacting said streams with a composition comprising the reaction product of mixing monoethanolamine, diglycolamine and formaldehyde.

BRIEF DESCRIPTION OF THE DRAWINGS

FIGS. 1(a) and 1(b) are graphical representations of the hydrogen sulphide scavenging performance of a triazine based scavenging composition of the prior art.

DESCRIPTION OF THE PREFERRED EMBODIMENT

Figure 1A:
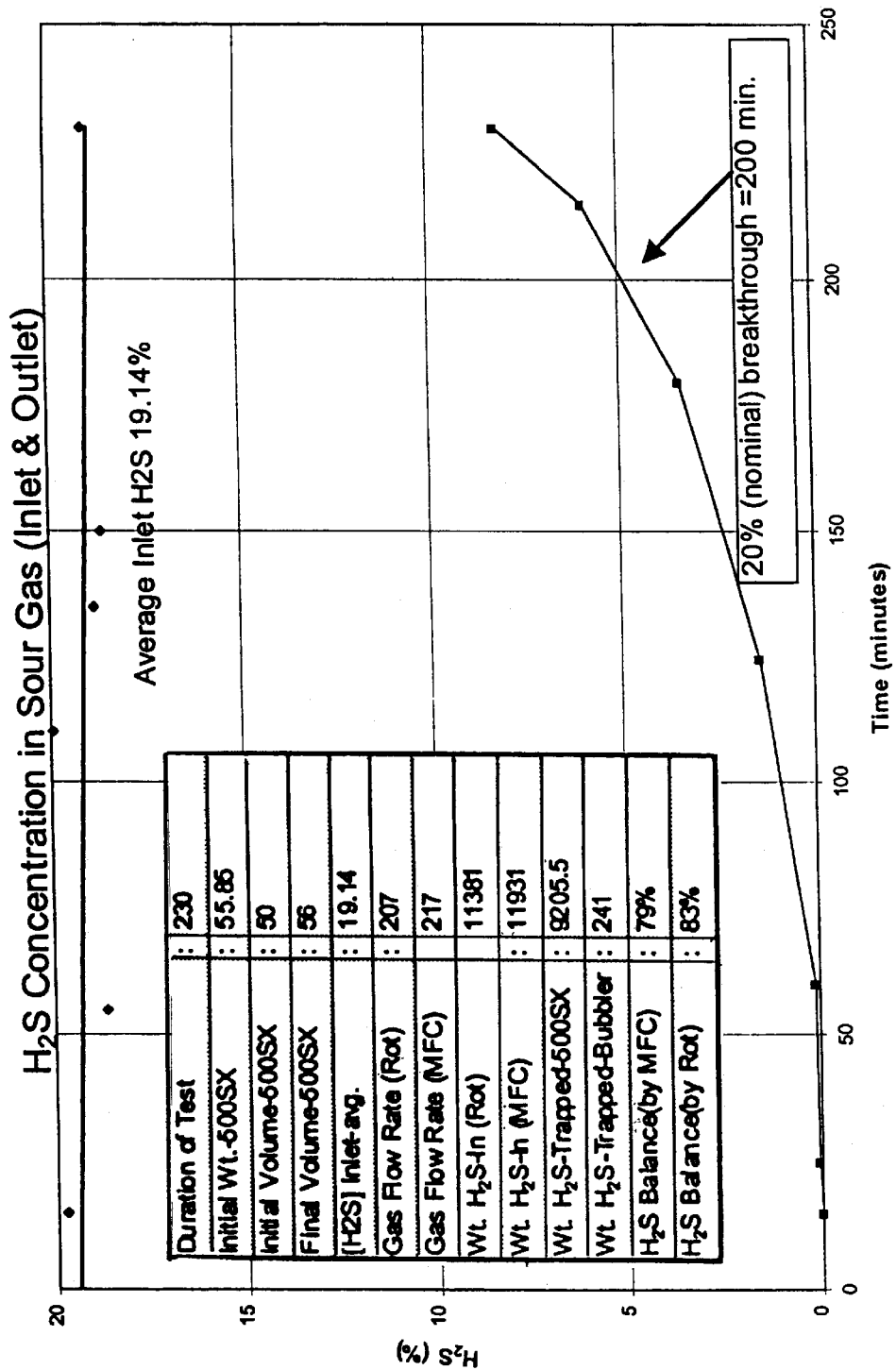

In one embodiment, the present invention provides a new hydrogen sulphide scavenging composition comprising the reaction product of mixing monoethanolamine and diglycolamine with formaldehyde. The molar ratio of total amines (consisting of monoethanolamine and diglycolamine) to formaldehyde may be from about 3:1 to about 1:3. Preferably, the molar ratio of total amines to formaldehyde is in the range of from about 1:1 to 1:3, more preferably from about 1:1 to 1:1.5. The molar ratio of monoethanolamine to diglycolamine may preferably be in the range of from about 95:5 to about 70:30, and more preferably about 90:10.

In considering the molar ratio of total amines to formaldehyde, it is to be understood that the preferred ratios refer to the amount of amines and formaldehyde that are mixed together and not necessarily the amount of amine and formaldehyde that forms a reaction product. It also to be understood that the amines and formaldehyde can be mixed in any order. For example, the amines can first be mixed together and the amine mixture combined with the formaldehyde. In the alternative, one or both of the amines can be first mixed with formaldehyde before being mixed with each other.

The reaction of the amines with the formaldehyde is strongly exothermic. It has been found that failure to control the temperature of the amine-aldehyde reaction results in a less active scavenging composition. In particular, it has been found that the temperature of the reaction should be maintained preferably below about 40° C. in order to avoid a significant reduction in scavenging activity. Temperature of the reaction can be controlled by mixing the reactants slowly over a period of time and while monitoring the temperature. The rate of mixing should be adjusted to maintain the temperature preferably below 40° C. In addition, cooling apparatus can be used to remove heat from the reaction vessel to maintain the desired temperature.

It has further been found that the activity of the scavenging composition can be maximized by adding the formaldehyde to the amine rather than vice versa. It is believed that high temperatures resulting from the exothermic amine-aldehyde reaction can cause unreacted formaldehyde to form formic acid or other intermediates which can then react with or inhibit the triazine produced by the amine-aldehyde reaction. This tendency is believed to be reduced when the formaldehyde is added to the amines.

EXAMPLE 1

As a reference sample, a reaction product (1) using 65.5 wt % Formalin (37.5% formaldehyde, 25% methanol) and 34.5 wt % monoethanolamine was formulated. The formaldehyde was slowly added to monoethanolamine while the mixture was stirred and the temperature of the mixture was maintained below 40° C. The molar ratio of monoethanolamine to formaldehyde was approximately 1:1.5.

A number of mixed amine reaction products were prepared using the same formulation and procedure as for reaction product (1) except that the 34.5 wt % component of monoethanolamine was replaced by a 34.5 wt % amine mixture comprising monoethanolamine and a second amine. The amines used in the mixtures and their amounts (expressed in a weight ratio) are set out in Table 1.

TABLE 1

| Amine Mixture | MeOH Top Layer (wt. %) | MeOH Bottom Layer (wt. %) |
|---|---|---|
| (1) 100% MEA | 13.18 | 5.64 |
| (2) 95% MEA:5% DEA | 12.94 | 5.46 |
| (3) 95% MEA:5% MIPA | 12.85 | 5.63 |
| (4) 95% MEA:5% DIPA | 13.15 | 5.64 |
| (5) 95% MEA:5% DGA | 12.43 | 5.60 |
| (6) 90% MEA:10% DGA | 8.63 | 4.20 |
| (7) 85% MEA:15% DGA | 13.15 | 5.66 |
| (8) 80% MEA:20% DGA | 13.21 | 5.84 |

MEA (monoethanolamine); DEA (diethanolamine); MIPA (monoisopropanolamine); DIPA (diisopropanolamine); DGA (diglycolamine)

Each of the reaction products in Table 1 was contacted with a gas stream containing approximately 80% $CO_2$ and 20% $H_2S$ until breakthrough was detected, except the reaction product of the amine blend of 90% MEA:10% DGA which was contacted with a gas stream containing approximately 95% $CO_2$ and 5% $H_2S$). Each spent reaction product sample was characterized by two distinct liquid phases. Sub-samples from the upper and lower phases were placed together in 20 mL glass vials. The bottom layer substantially comprised dithiazine in liquid form and the upper layer comprised substantially reaction intermediates and water. The amount of methanol in each layer is shown in Table 1.

While a simple reduction in temperature below about 20° C. will initiate dithiazine crystal growth in gas processing equipment in field applications, a similar temperature reduction in laboratory conditions usually does not intiate crystal growth. It is believed that the presence of contaminants in field applications offers numerous nucleation sites to initiate and promote crystallization. In order to accurately detect the onset of crystal growth in laboratory equipment, each layer of each reaction product sample was seeded with a dithiazine crystal.

At room temperature (approx. 20° C.) the seed crystal dissolved in the bottom dithiazine layer of all samples. The vials were then placed in a cryogenic bath and cooled with glycol to 15° C. and each sample was reseeded with a dithiazine crystal. All seed crystals remained intact, but no additional crystal growth occurred. The temperature was then reduced to 10° C. and the samples were left overnight at which point solidification could be observed in all samples except those containing the amine blends of 85% MEA:15% DGA and 80% MEA:20% DGA. For the spent reaction products which comprised MEA and other than DGA, the solids were slightly different in appearance than the crystalline solids produced in the spent MEA reaction product, but the difference was judged to be relatively insignificant. However, the solids that formed in the spent reaction products which comprised MEA and DGA were significantly different, displaying a soft and amorphous nature.

The temperature was then reduced to 5° C. and the samples were again left overnight. Further crystal growth and solids formation occurred in all samples. Again, the solids that formed in the spent reaction products which comprised MEA and DGA were soft and amorphous nature. A very small amount of crystalline growth was also observed in the 80% MEA:20% DGA sample, but this was considered to be insignificant, and possibly due to laboratory error.

The temperature was then reduced to 0° C. and the samples were again left overnight. All samples were substantially entirely solid. The amine blends of 90% MEA: 10% DGA; 85% MEA:15% DGA and 80% MEA:20% DGA exhibited soft amorphous solids. The amine blend of 95% MEA:5% DGA exhibited a mixture of crystalline solids and soft and amorphous solids. All other samples exhibited hard crystalline solids only.

From the tests described above, it can be seen that the samples comprising the spent reaction product from a mixture of MEA and DGA formed solids that were substantially or partially amorphous and of a soft or "mushy" consistency. In contrast, all other samples formed hard crystalline solids at various temperatures of 15° C. and below.

EXAMPLE 2

A scavenger solution in accordance with the present invention comprising a reaction product using 76.7 wt % Formalin (37.5% formaldehyde, 25% methanol), 21 wt % monoethanolamine and 2.3 wt % DGA was formulated. The solution was blended by slowly adding formaldehyde to a MEA/DGA mixture until a 1:1 molar ratio of amine to formaldehyde was achieved. During the blending procedure, the mixture was stirred and the temperature of the mixture was maintained below 40° C. The balance of the formaldehyde was then slowly added. The molar ratio of amines to formaldehyde was approximately 1:2.6.

The scavenger solution was used in a circulating bubble tower contactor for scavenging natural gas until the chemical was spent. Three samples were obtained from the spent chemical storage tank, pump return #1 and pump return # 2. The samples from the storage tank and pump return #1 contained two phases, a light red/amber upper phase and a darker lower phase. The sample from pump return #2 was a single amber phase.

Sub-samples of both phases and of each phase separately were placed in 20 mL glass vials. Four sub-samples of each of the three types (1 upper phase, 1 lower phase, 1 both phases) were assembled and 2 of each of the four were seeded with a single dithiazine crystal at 15° C. Thus, there were two identical sets of 6 sub-samples, viz. Upper layer seeded, upper layer unseeded, lower layer seeded, lower layer unseeded, both layers seeded, both layers unseeded.

The vials from the first set were placed in a cryogenic bath cooled with glycol. Starting at the 15° C. temperature required to maintain the seed crystal as a separate solid phase in each mixture, the samples were cooled by two degree increments to 1° C. The samples were held at each temperature for a 24 hour period and visually examined before cooling to the next temperature. The vials from the second set were placed in a freezer at −5° C. and maintained at that temperature for a 24 hour period and then visually examined. They were then placed in a deep freeze at −25° C. for a two hour period and visually examined.

In the first set, at 5° C., significant amorphous (non-crystaline) type solids had formed in all three seeded samples. No solids were observed to have formed in any of the non-seeded samples. In the second set, solids were seen to form in each of the seeded samples at −5° C. No solids were formed in the unseeded samples. The solids formed in the seeded samples were soft and amorphous and were very similar to the type observed in the first set. At −25° C., all the samples solidified completely. The unseeded samples were solidified homogeneously throughout each phase present. The seeded samples, which still had the solids formed at −5° C. when they were placed in the deep freeze, appeared to contain two types of solids at the colder temperature, i.e., the residual amorphous solids and ice-like solids that formed at −25° C.

In summary, in the presence of residual solids, which may act as seed crystals in the saturated scavenger solutions or mixtures, solidification was observed to initiate in the lower phase at 5° C. The solids were soft and amorphous in consistency. In the absence of seed crystals, the spent solutions were observed to supercool to −5° C. without forming solids.

EXAMPLE 3

Figure 2A:
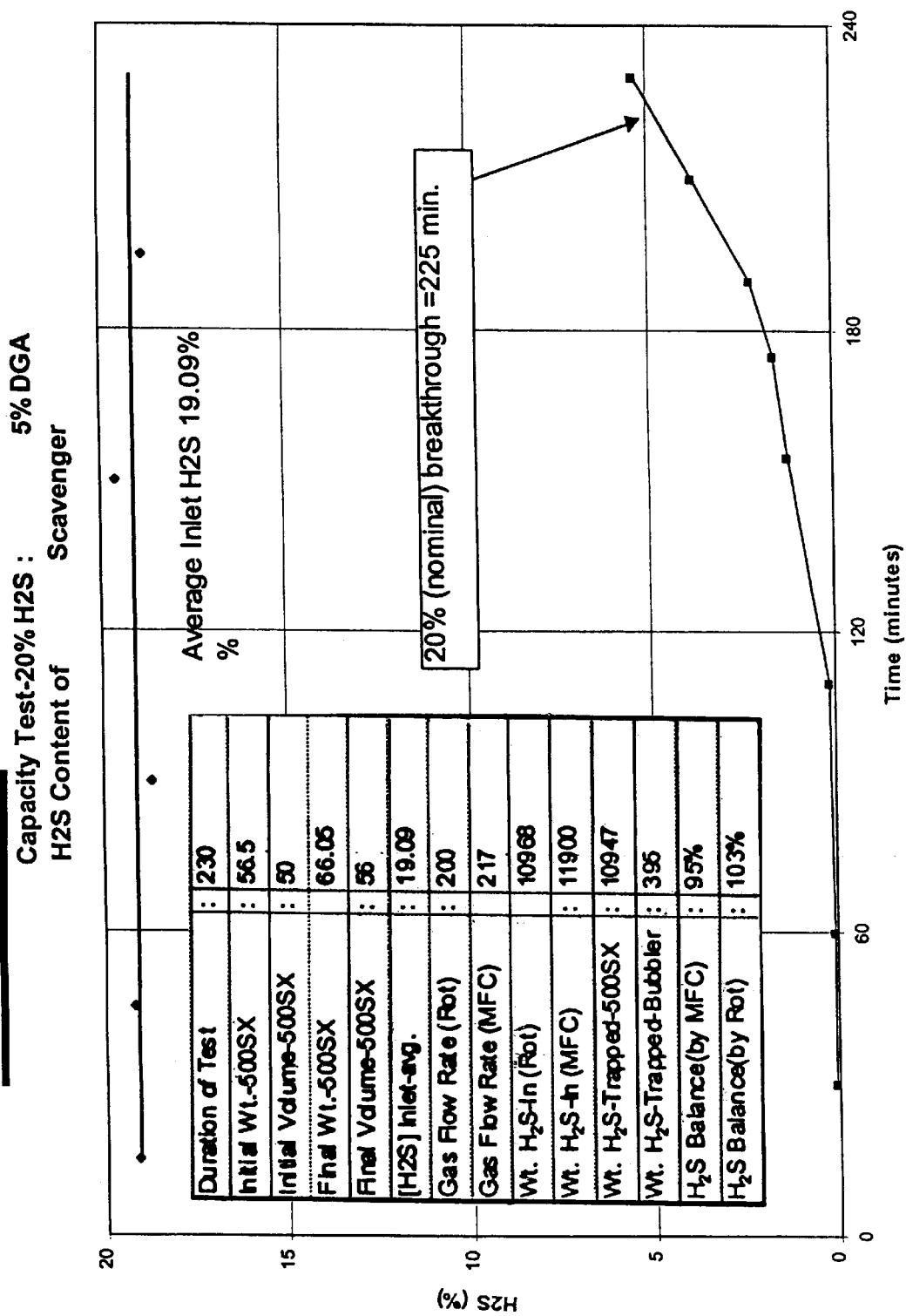
FIGS. 2(a) and 2(b) are graphical representations of the hydrogen sulphide scavenging performance of a scavenging composition of the present invention in which 5% by wt of MEA has been replaced with DGA.
Figure 2B:
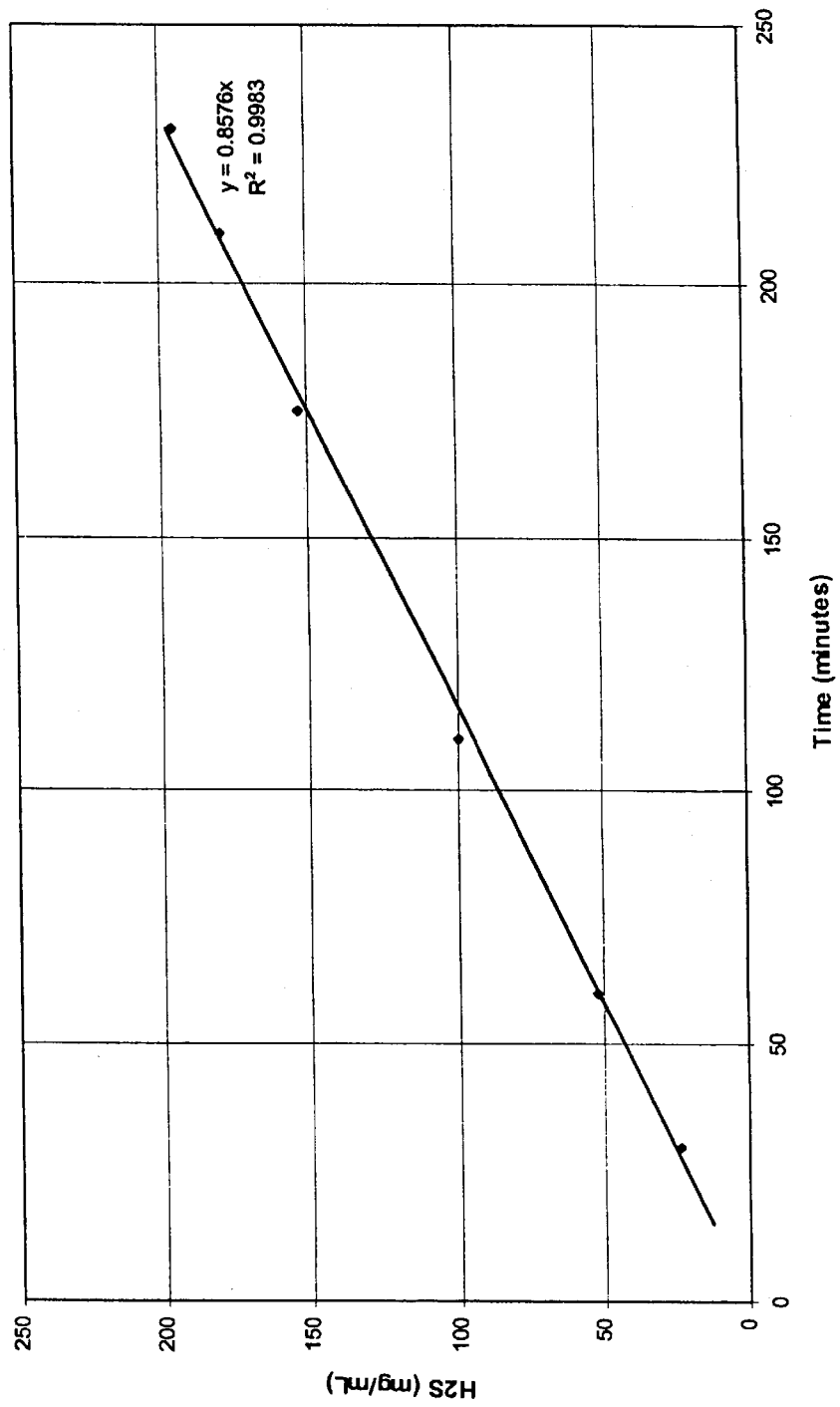
Figure 3A:
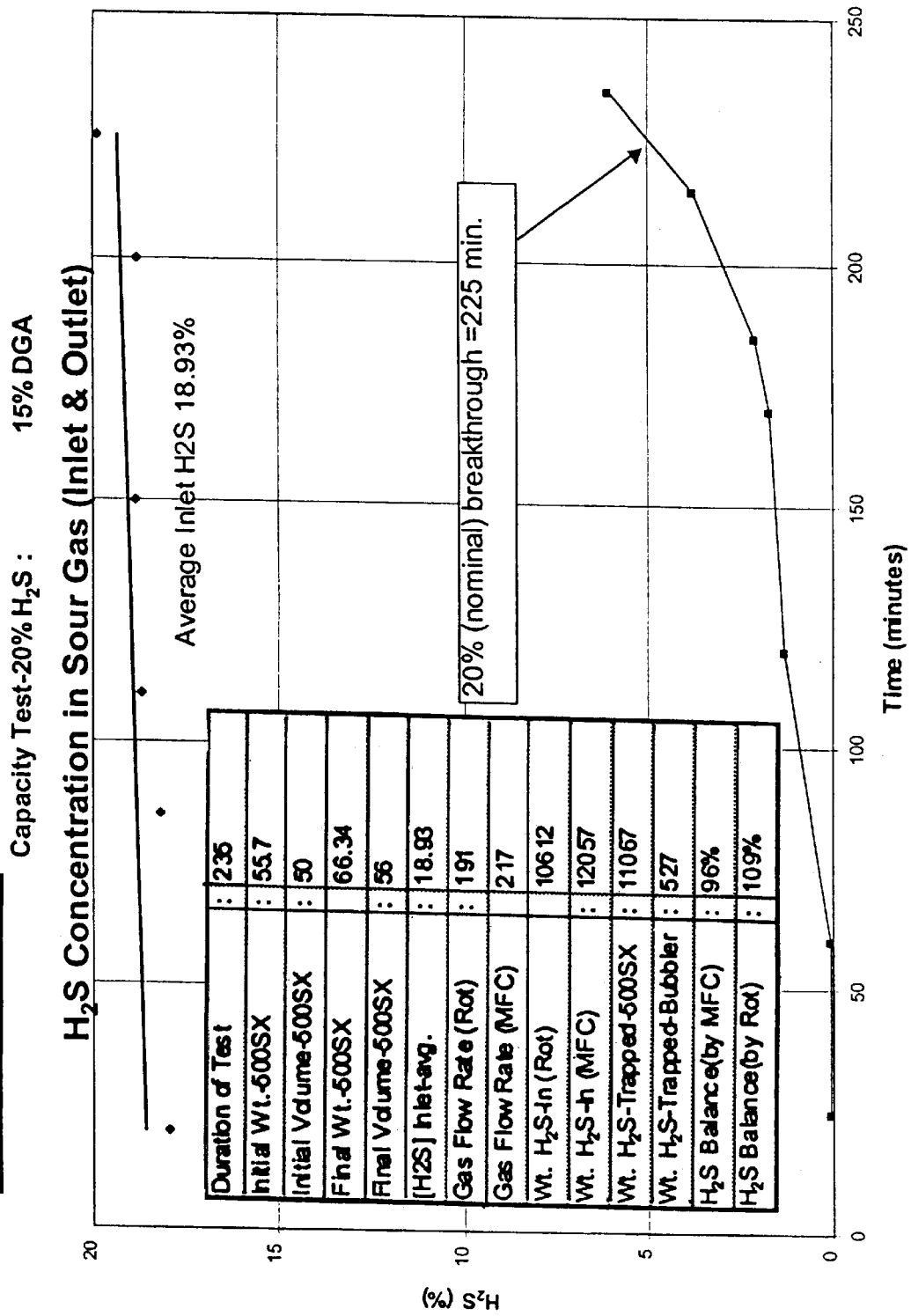
FIGS. 3(a) and 3(b) are graphical representations of the hydrogen sulphide scavenging performance of a scavenging composition of the present invention in which 15% by wt of MEA has been replaced with DGA.
Figure 3B:
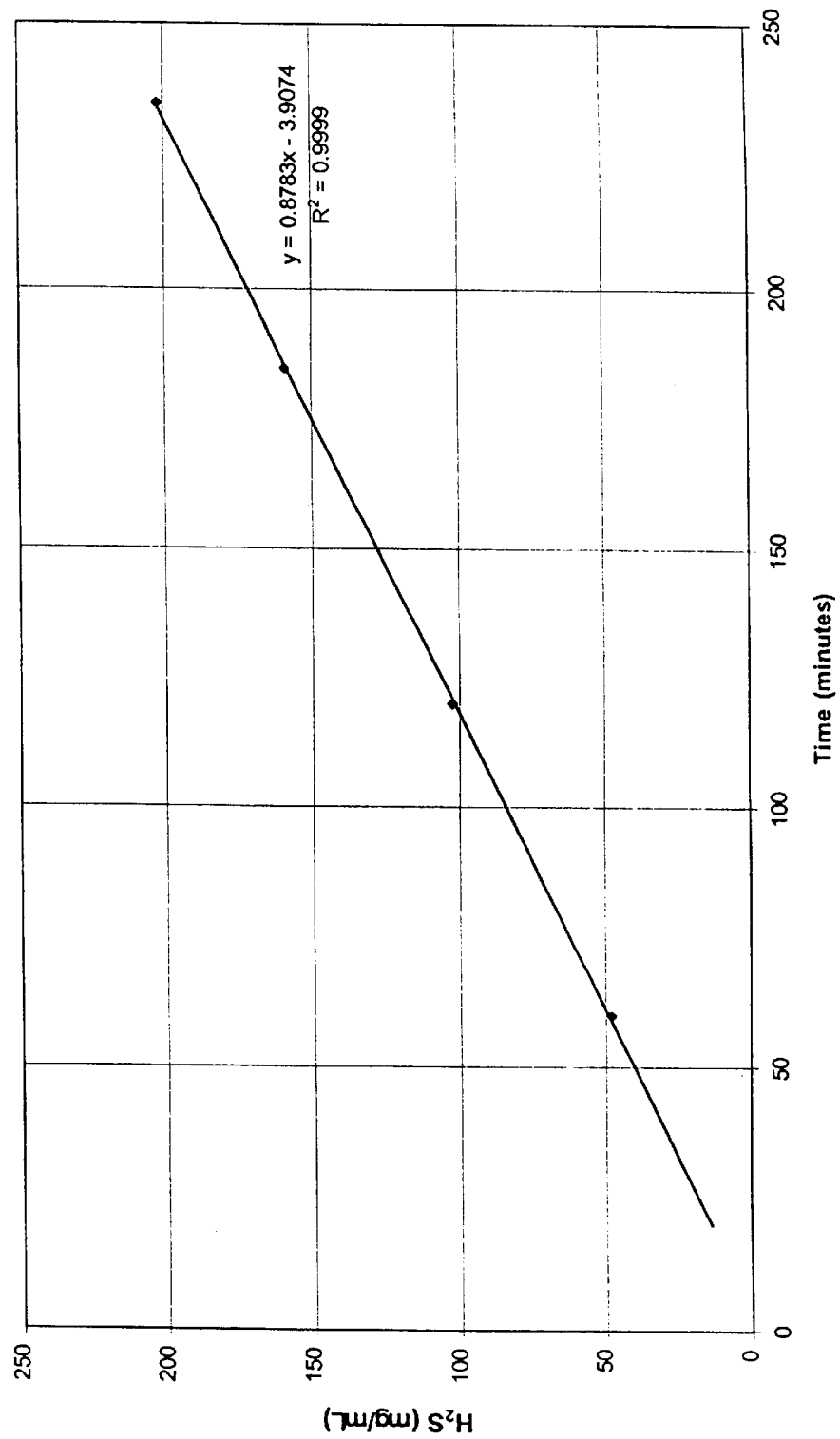

Reaction products (1), (6) and (8) in Example 1 were subjected to hydrogen sulphide scavenging capacity tests. The inlet gas comprised approximately 19% hydrogen sulphide and the remainder $CO_2$. The results for control reaction product (1) are presented in FIGS. 1(a) and 1(b) and show that breakthrough (20% nominal) occurred at 200 minutes, scavenging about 165 mg $H_2S$/mL. The results for reaction product (6) (95% MEA:5% DGA) shown in FIGS. 2(a) and 2(b) and reaction product (8) (85% MEA:15% DGA) were slightly better, with both MEA/DGA reaction products producing breakthrough at 225 minutes, scavenging about 200 mg $H_2S$/mL.

Field application experience has confirmed the laboratory test results. In particular, reactions products of the present invention formed by reacting formaldehyde with a mixture of MEA and DGA freeze at a lower temperature than do corresponding MEA-formaldehyde reaction products that do not contain DGA. More importantly, where dithiazine crystal deposits formerly occurred in gas processing equipment using conventional MEA-formaldehyde reaction products, in many cases no solids are produced when the reaction products of the present invention are used. Where solids have occurred, primarily in extremely low temperature applications, the solids are "mushy" in texture and can be easily cleaned out of the gas processing equipment with steam or hot water.

Without wishing to be bound by any theory, it is believed dithiazine crystal formation is promoted when a relatively pure dithiazine liquid is cooled below its freezing point. By replacing a portion of MEA with DGA, a mixed reaction product is produced having slightly different triazine structures. In particular, the reaction product of MEA and formaldehyde is rich in 1,3,5 tri-(2-hydroxyethyl)-hexahydro-S-triazine and the reaction product of a mixture of MEA and DGA with formaldehyde also includes 1,3,5 (2H, 4H, 6H)-tri(2-ethoxyethanol)-1,3,5-triazine. When this mixed reaction product reacts with hydrogen sulphide, a non-homogeneous lower phase containing mixed dithiazine reaction products is formed. It is believed that this non-homogeneity tends to impede crystal growth and instead promotes amorphous solids formation.

It will be evident that the amount of MEA that can be replaced by DGA will vary depending upon the application. It has been found that at replacement levels below about 5%, the formation of dithiazine crystal deposits may not be avoided, while replacement levels above about 20% may cause undesirable foaming of the reaction product in use.

The reaction product of the present invention can be used to scavenge hydrogen sulphide and mercaptans from a variety of hydrocarbon streams, including sour natural gas streams and liquid hydrocarbon streams. The reaction product of the present invention can be contacted with natural gas by a number of means including inline injection or with a contact scrubber tower. The reaction product of the present invention can be used to reduce the level of hydrogen sulphide in natural gas streams to pipeline specifications (which is typically 16 ppm or lower) or to 0 ppm.

We claim:

1. A hydrogen sulphide and mercaptan scavenging composition comprising the reaction product of mixing monoethanolamine, diglycolamine and formaldehyde.

2. The composition according to claim 1 wherein the molar ratio of monoethanolamine and diglycolamine to formaldehyde is from about 3:1 to about 1:3.

3. The composition according to claim 1 wherein the molar ratio of monoethanolamine and diglycolamine to formaldehyde is from about 1:1 to about 1:3.

4. The composition according to claim 1 wherein the weight ratio of monoethanolamine to diglycolamine is from about 80:20 to about 95:5.

5. The composition according to claim 1 wherein the weight ratio of monoethanolamine to diglycolamine is about 90:10.

6. The composition according to claim 1 wherein the molar ratio of monoethanolamine and diglycolamine to formaldehyde is from about 3:1 to about 1:3 and the weight ratio of monoethanolamine to diglycolamine is from about 80:20 to about 95:5.

7. The composition according to claim 1 wherein the molar ratio of monoethanolamine and diglycolamine to formaldehyde is about 1:1.5 and the weight ratio of monoethanolamine to diglycolamine is from about 90:10.

8. The composition of any one of claims 1 wherein the reaction product comprises 1,3,5 tri-(2-hydroxyethyl)-hexahydro-S-triazine and 1,3,5 (2H,4H,6H)-tri(2-ethoxyethanol)-1,3,5-triazine.

9. A scavenging composition comprising a mixture of 1,3,5 tri-(2-hydroxyethyl)-hexahydro-S-triazine and 1,3,5 (2H,4H,6H)-tri(2-ethoxyethanol)-1,3,5-triazine.

10. A spent hydrogen scavenger composition comprising the reaction product of the composition of any one of claims 1 to 8 and hydrogen sulphide, said spent composition comprising dithiazine solids in amorphous form.

* * * * *